Dec. 16, 1941.    W. R. SMITH    2,266,091
ANIMATED TOY STATION TRUCK AND ATTENDANT
Filed Feb. 10, 1940    7 Sheets-Sheet 1
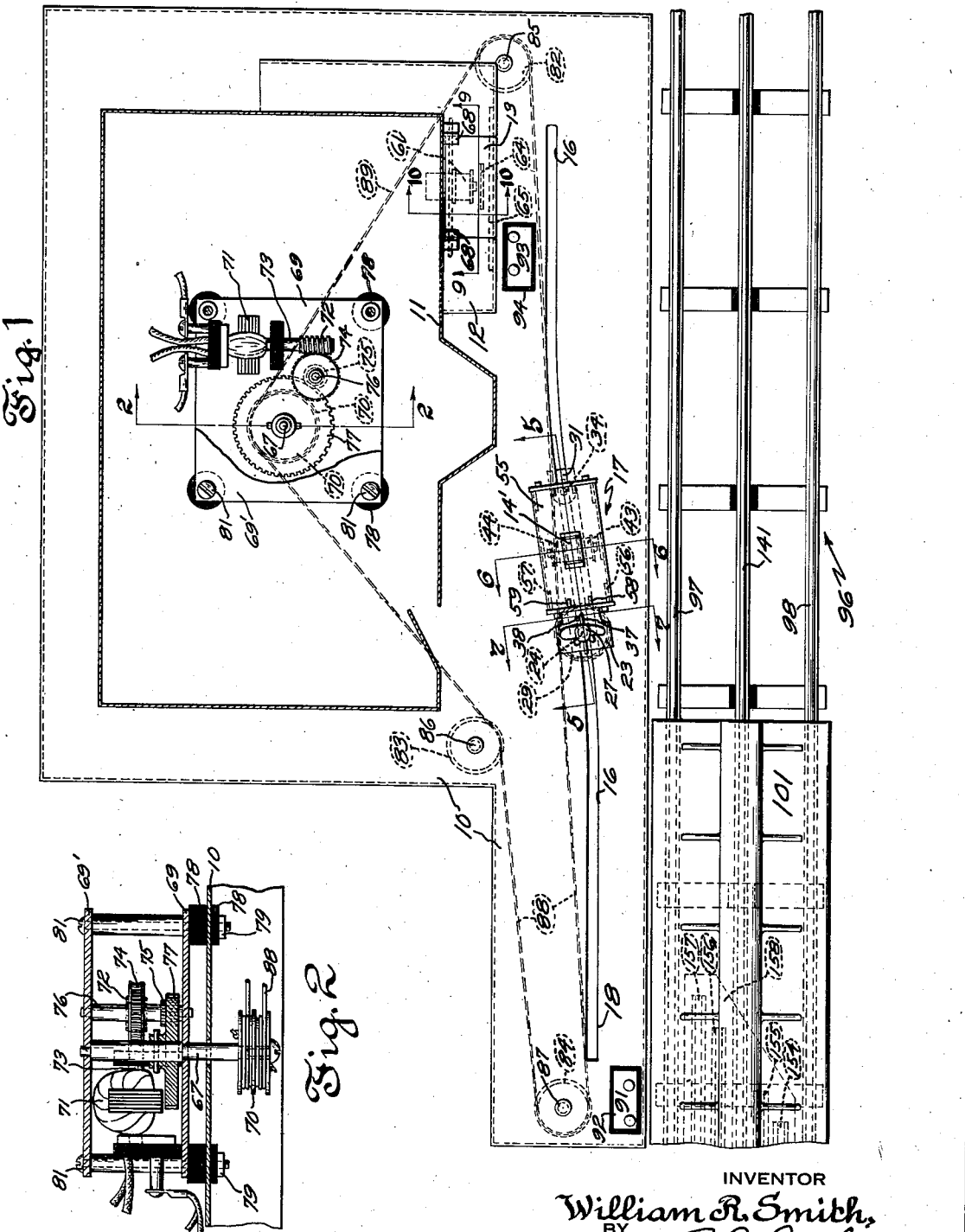
INVENTOR
William R. Smith,
BY
ATTORNEY

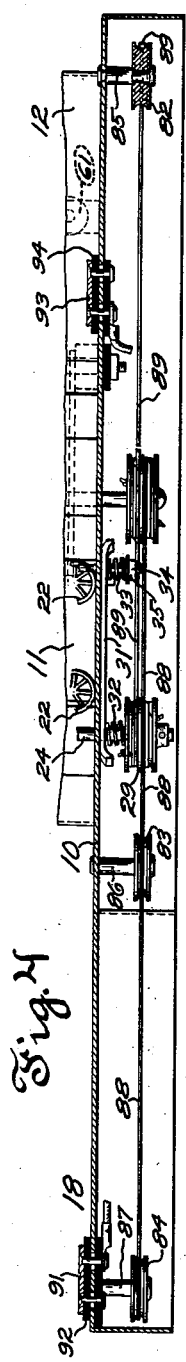

Dec. 16, 1941.   W. R. SMITH   2,266,091
ANIMATED TOY STATION TRUCK AND ATTENDANT
Filed Feb. 10, 1940   7 Sheets-Sheet 3

INVENTOR
William R. Smith,
BY
ATTORNEY

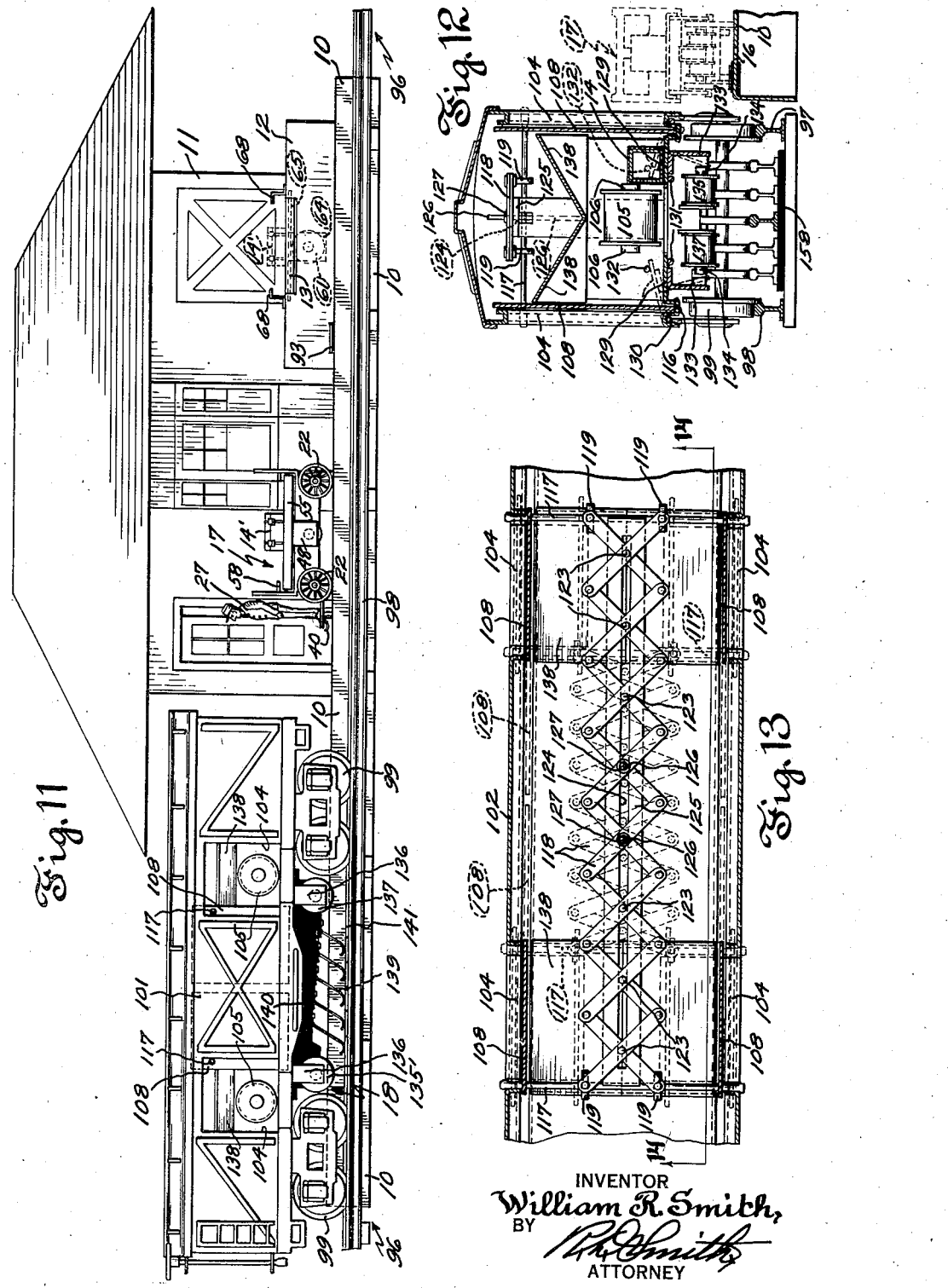

Dec. 16, 1941.  W. R. SMITH  2,266,091
ANIMATED TOY STATION TRUCK AND ATTENDANT
Filed Feb. 10, 1940  7 Sheets-Sheet 5
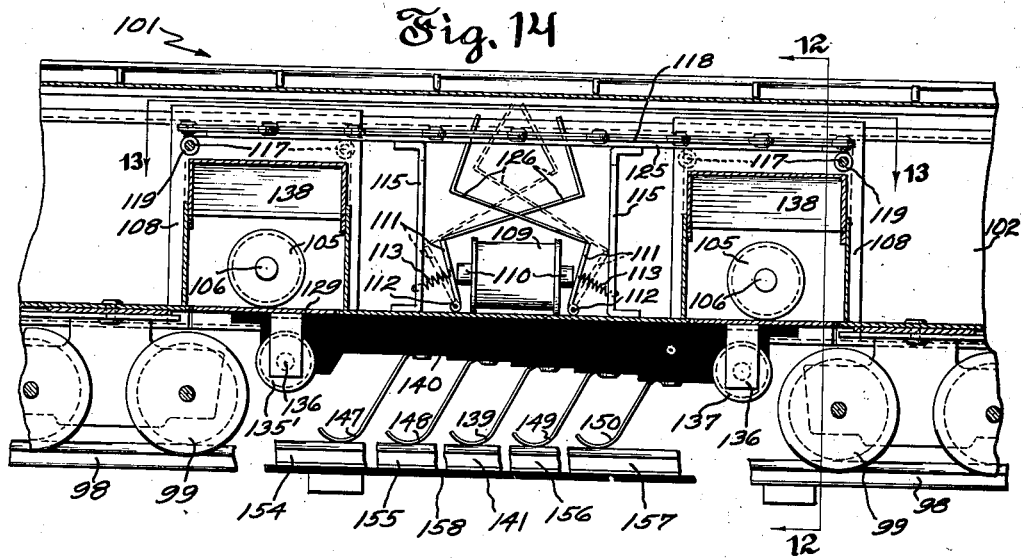
Fig. 14
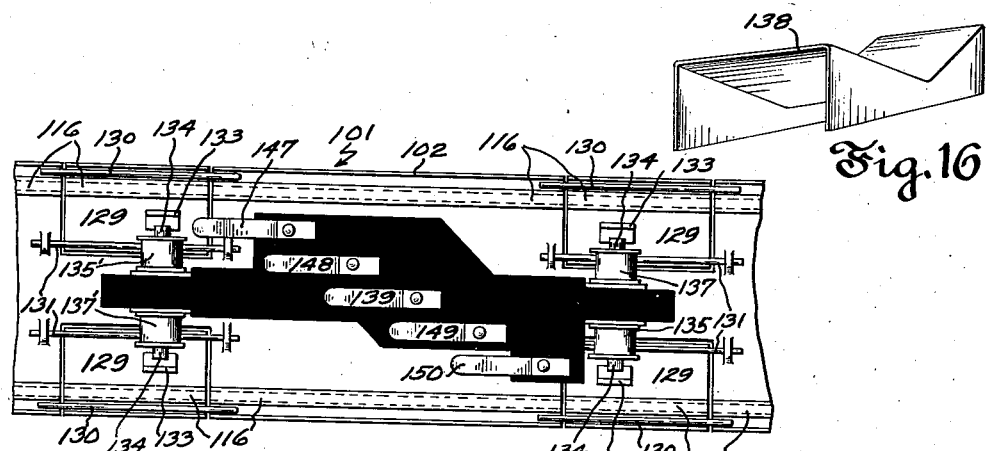
Fig. 15
Fig. 16
INVENTOR
William R. Smith,
BY
ATTORNEY

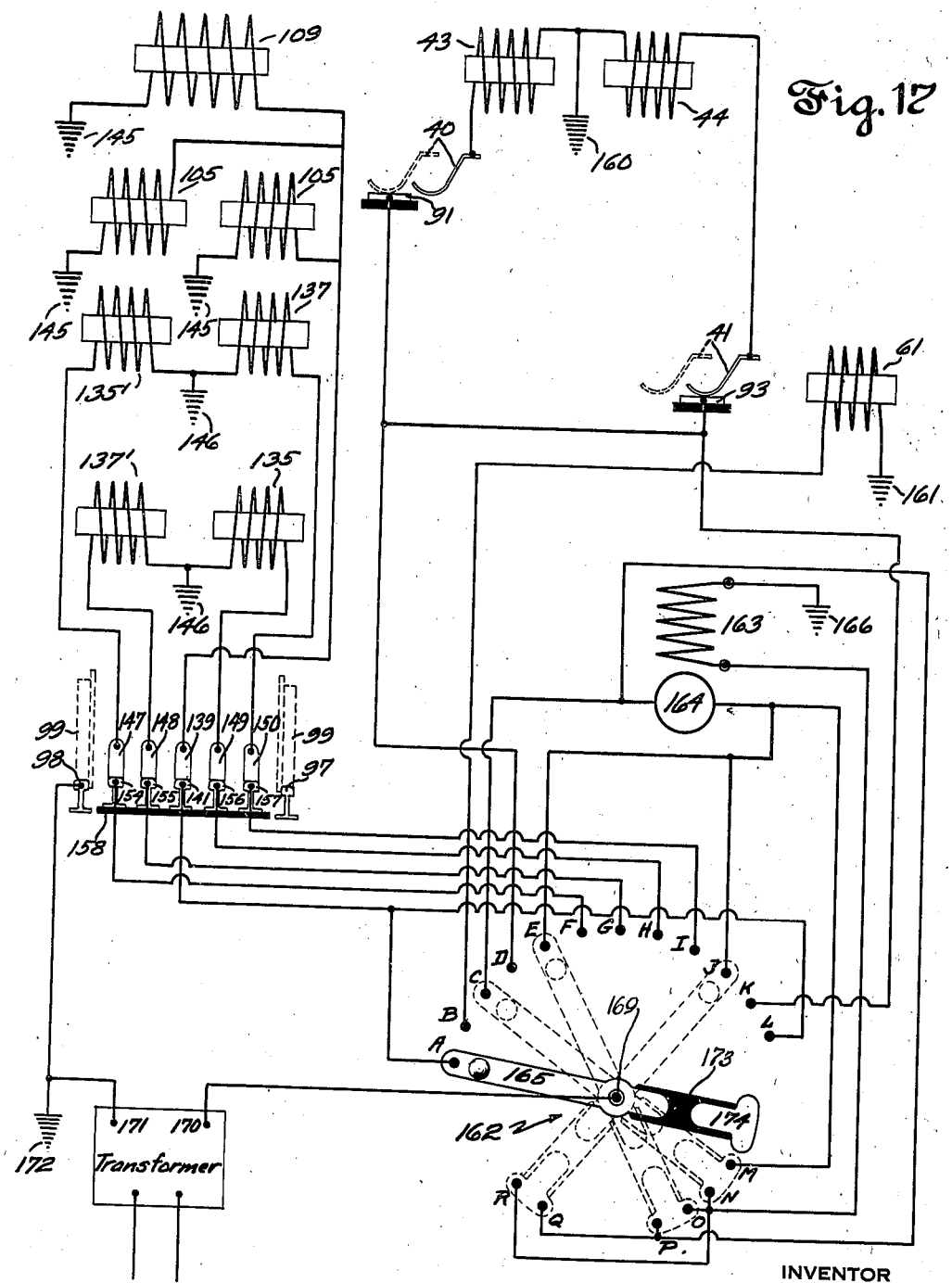

Dec. 16, 1941.                W. R. SMITH                2,266,091
              ANIMATED TOY STATION TRUCK AND ATTENDANT
                   Filed Feb. 10, 1940        7 Sheets-Sheet 7
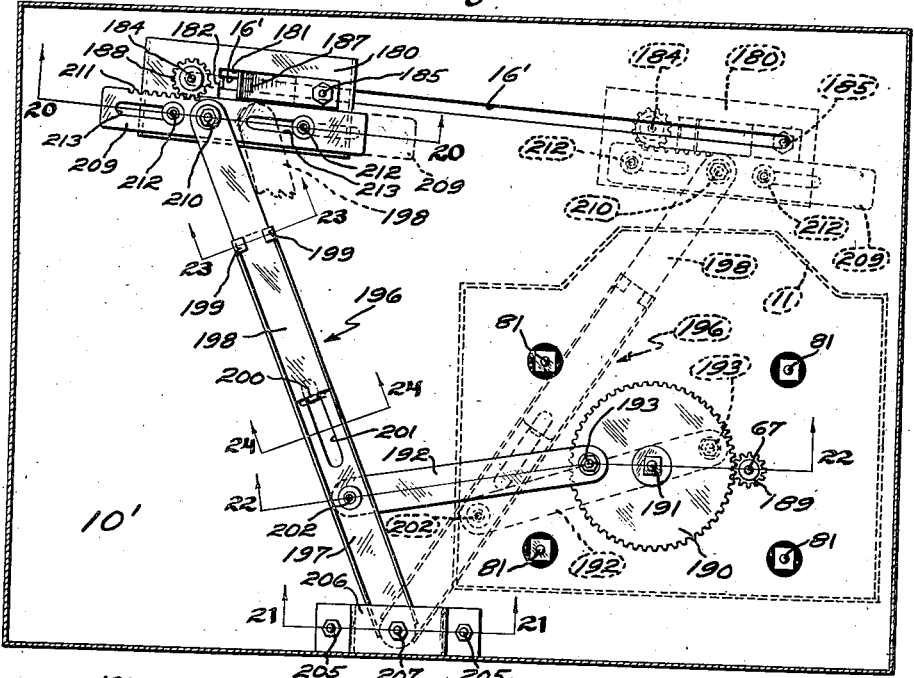
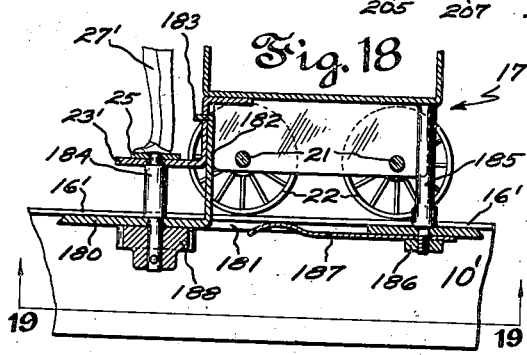
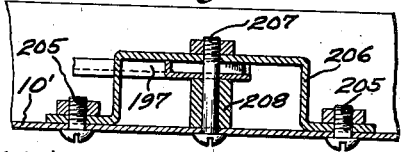
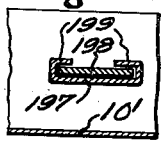
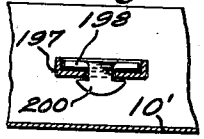
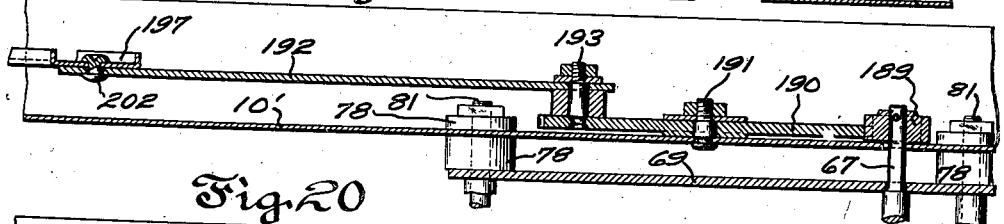
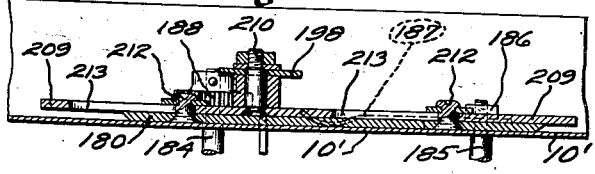
INVENTOR
William R. Smith,
BY
ATTORNEY Patented Dec. 16, 1941

2,266,091

UNITED STATES PATENT OFFICE 2,266,091

ANIMATED TOY STATION TRUCK AND ATTENDANT

William R. Smith, Philadelphia, Pa., assignor to The A. C. Gilbert Company, New Haven, Conn., a corporation of Maryland Application February 10, 1940, Serial No. 318,365

25 Claims. (Cl. 46—107)

This invention relates in general to toys automatically motivated under electrical control for simulating activities of men and equipment associated with railway operation and particularly in connection with loading and/or unloading baggage from a train while drawn up at the platform of a railway station or depot.

One object of the invention is to provide an electrically operated toy set including a stretch of toy track, a toy train including a baggage, express or freight car, a toy railway station having a platform alongside the track, and a toy baggage truck running along the platform on wheels preferably accompanied by an animated figure representing a baggage man, all set up and so electrically operable under remote control that the parts mentioned realistically imitate the familiar performance of loading, unloading and transferring baggage at and between the toy train and a baggage room in the toy station.

A further object is to cause a toy baggage truck, preferably with its imitative operator or attendant, automatically to perform excursions between an elevated landing or some other form of baggage repository at the baggage room and a terminal of the path of truck travel which is located on the railway station platform adjacent a train standing at the station, for the purpose of transferring baggage between said repository and said train.

A further object of the invention is to provide means for transferring a toy baggage piece between the respository and the baggage truck as well as between the baggage truck and a car of the toy train, at times suitably synchronized or coordinated with the excursions and positions of the truck.

A further object is so to operatively associate the toy figure of a baggage man with the baggage truck that said toy figure becomes automatically animated and its actions become coordinated with the performance of the baggage truck in such way that the effect is produced of the truck appearing to be operated by the "baggage man."

A further object is to afford selective remote electrical control for the entire toy so that the sequence of train action and baggage loading, unloading and transfer actions may be determined and varied at the operator's will.

With the foregoing and related objects in view, an illustrative form of toy apparatus embodying the present improvements is set forth in the following description, in which reference is had to the accompanying drawings, wherein the arrows on all section planes denote the direction of observation in which each corresponding sectional view is drawn.

Fig. 1 is a plan view partly in section of a toy railway station with its platform and a section of the adjacent track, showing one car of a train, and showing the animated baggage truck on the station platform with its electrical prime mover inside the station house whose roof is removed.

Fig. 2 is an enlarged fragmentary view taken in section through the electrical power plant on the plane 2—2 in Fig. 1.

Fig. 3 is a bottom plan view of the station platform.

Fig. 4 is a fragmentary front view taken in section through the station platform on the planes 4—4—4—4 in Fig. 3.

Fig. 5a shows the baggage man figure turned to a direction facing his truck.

Fig. 11 is a front view of the station and its platform together with the track rails and toy car at front of same.

Fig. 12 is a view drawn on an enlarged scale taken in section crosswise through the baggage car and track rails on the plane 12—12 in Fig. 14.

Fig. 13 is a fragmentary plan view on a like scale showing the interior of the baggage car with its roof removed and certain parts sectioned on the plane 13—13 in Fig. 14.

Fig. 14 is a view taken in section through the baggage car on the plane 14—14 in Fig. 13.

Fig. 15 is a fragmentary bottom plan view of a central portion of the car.

Fig. 16 is a perspective view of an auxiliary roof section removed from the baggage receiving compartment of the car.

Fig. 17 is a diagram of an electrical system by which the performance of the different parts of the complete toy may be initiated and synchronized under remote control.

Fig. 18 is a fragmentary view corresponding to Figs. 5 and 5a showing a modified and simplified construction of station truck and animated toy figure attendant.

Fig. 19 is a bottom plan view of a modified form of station platform drawn on a smaller scale than Fig. 18 and taken in section on the plane 19—19 therein, showing a modified form of toy animating mechanism for transmitting power and motion from the motor to the truck and its toy attendant.

Figure 9:
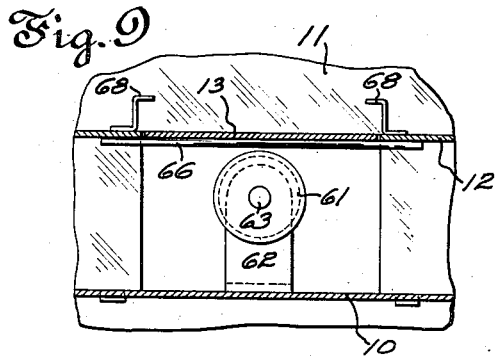
Fig. 9 is an enlarged fragmentary view taken in section through the baggage repository at the baggage room on the plane 9—9 in Fig. 1.

Figs. 20, 21, 22, 23 and 24, inclusive, are fragmentary views drawn on the same scale as Fig. 18 taken in section on the planes 20—20, 22—22, 23—23, and 24—24, respectively, in Fig. 19.

The structure of the railway station includes a low hollow platform 10 which may be made of sheet metal and carries superimposed thereupon the upright walls of a station house 11, one corner of which is bordered by a hollow raised landing 12 having a swingable floor section 13. At times this raised landing serves as a respository for a toy luggage piece 14 which may be catapulted from its swingable floor section 13 in a manner and for a purpose which will presently appear. Station platform 10 has cut out from its floor wall the elongated slot 16 which determines the path of travel of the animated baggage truck 17 in excursions of the latter between respository 12 and a track-side terminal 18 of the slot 16.

As best shown in Figs. 5 to 8, inclusive, truck 17 may be composed of a sheet metal body 19 which gives bearing to the axles 21 of the truck wheels 22. The latter ride upon and in electrical contact with the floor wall of platform 10. Offset from one end of truck body 19, and rigid therewith, is a support shelf 23 which affords one pivotal bearing for the vertical figure-operating shaft 24 whose top end is rigid with the feet-like pedestal 26 of a toy figure 27 resembling a baggage man. This figure is caused to appear to operate the truck in a manner hereinafter to be explained. Pedestal 26 rotates atop a thrust washer 25 which rests upon the upper surface of support shelf 23. On the lower end of shaft 24 there is fixed by means of pin 28 the hub of a double grooved pulley 29 between which and the bottom surface of the floor wall of platform 10 there is retained one end portion of the presser strip 31 which is constantly thrust upward against said floor wall by the coiled compression spring 32 surrounding shaft 24. The other end portion of presser strip 31 is in a like manner thrust upward against the same floor wall by another compression spring 33 surrounding a downwardly extending guide post 34 rigid with the truck body 19. Spring 33 is retained on a lower end of post 34 by nut 35 which has threaded engagement with the post.

Figure 6:
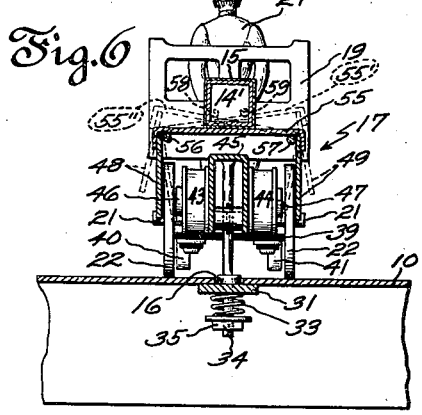
Fig. 6 is a correspondingly enlarged view taken in section crosswise through the baggage truck on the plane 6—6 in Fig. 1.
Figure 7:
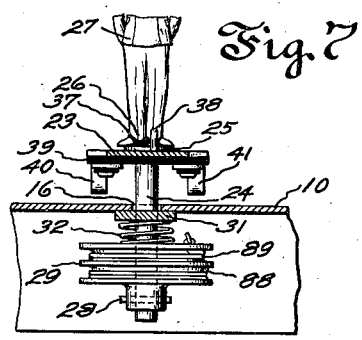
Fig. 7 is a correspondingly enlarged view taken in section on the plane 7—7 in Fig. 1.

The degree of turning of shaft 24 is limited by a horizontal stop pin 37 which is fixed in the rotatable figure 27, opposite ends of which pin engage with a vertical stop pin 38 upstanding rigidly from the truck shelf 23. Beneath shelf 23 there is mounted a plate of insulating material 39 carrying downwardly extended electrical contact fingers 40 and 41 insulated from each other, as well as from the truck body, with the assistance of plate 39, and serving as current collecting shoes for at times leading electric current respectively to magnets 43 and 44 which are rigidly mounted on opposite sides of an inverted U-shaped bracket 45 which is rigid with truck body 19. Magnets 43 and 44 serve at different times to attract toward their respective cores 46 and 47 the respective armatures 48 and 49 both of which are rigid with, and depend from, a tippable table 55 which freely rests upon a pair of fulcrum pins 56 and 57, located at respectively opposite sides of the table at each end of the table. The degree of tipping movement permitted to table 55 is limited in one direction by the stop pins 58 at both ends of the table and in the other direction by stop pins 59 also located at both ends of the table. Each of stop pins 58 and 59 is fixed in the frame of the truck body 19 as shown in Fig. 6.

Figure 10:
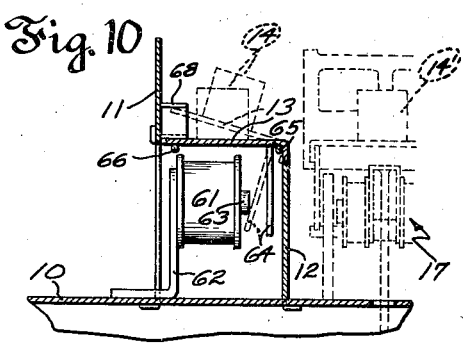
Fig. 10 is a correspondingly enlarged view taken in section on the plane 10—10 in Fig. 1.

As best shown in Figs. 1, 9, and 10, the hollow baggage landing 12 which serves as luggage repository outside the imitative baggage room of the toy station also serves to house a catapult electromagnet 61 which is fixedly mounted on the station platform by the bracket 62. Flanking the core 63 of magnet 61 is an armature 64 which is rigid with and depends from the swingable section 13 of the landing floor which latter, until actuated by magnet 61, lies in horizontal position, resting at its front on the frame supported fulcrum rod or hinge pin 65 and at its rear on the frame supported stop rod 66. A frame supported stop bracket 68 is shaped and positioned to limit the upward swing of section 13 to its broken line position in Fig. 10.

On the platform 10 within station house 11 is mounted the base 69 of a power plant unit which includes the electric motor 71 and a train of reduction gears consisting of a worm 72 fast on the motor shaft 73, a worm wheel 74 meshing with worm 72, a pinion 75 fixed to the same shaft 76 as is worm wheel 74, and a large spur gear 77 fast to the vertical shaft 67. Both shafts 67 and 73 are journaled in the frame plates 69 and 69'. Shaft 67 projects downward through the floor wall of platform 10 and carries fixed to it therebelow the capstan pulley 70. To prevent transmission of noisy vibration from the power unit to any sheet metal structure of the station platform, washers 78 of suitably soft material may be interposed between the base 69 of the power unit and the platform structure as well as between the platform structure and the holding nuts 79 which have threaded engagement with the fastening bolts 81 for securing the power unit and thereby stationing pulley 70 in relation to the platform.

Also mounted in fixed positions on the station platform beneath the floor wall of same there are three freely rotatable guide pulleys 82, 83, and 84, best shown in Fig. 3. These pulleys are retained in a manner to rotate freely on studs 85, 86, and 87, respectively, each of which studs is rigid with and projects downward from the station platform. A continuous flexible draft cord 88 at one of its ends winds and unwinds about the lower groove in pulley 29 and is attached thereto, and at its other end winds and unwinds about the lower groove in pulley 70 and is attached thereto. Cord 88 bears against idler pulley 83 and extends around and bears on guide pulley 84. A similar draft cord 89 at one of its ends winds and unwinds about the upper groove in pulley 29 and is attached thereto and at its opposite end winds and unwinds about the upper groove in pulleys 70 and is attached thereto. Cord 89 extends around and bears on pulley 82.

On the top surface of the station platform near terminal 18 of the platform slot 16, as best shown in Figs. 1 and 3, there is mounted an electric contact plate 91 insulated from the metallic structure of the station platform by spacers 92 of non-conductive material. Adjacent the baggage repository 12 on the top surface of the station platform there is a similar contact plate 93 insulated from the metallic structure of the station platform by spacers 93 of non-conductive material. At times contact plates 91 and 93 cooperate with the aforementioned contact shoes 40 and 41 respectively, in the travel of the baggage truck 17 along platform slot 16 to determine certain automatic actions of the apparatus.

In Fig. 1, a stretch of toy railway track 96 is shown at the front edge of the station platform 10 composed of outer rails 97 and 98 upon which the wheels 99 of the cars and electrical impelling locomotive of a toy train may roll in usual manner as indicated by car 101 appearing in Figs. 1 and 11. This illustrative car of the train is specially equipped to participate in the automatic handling and transfer thereto and therefrom of the baggage piece 14 as is shown more particularly in Figs. 11 to 15 inclusive.

The usual frame 102 of the box type of car 101 forms an enclosure which may have two pairs of baggage loading and unloading door openings 104 in the side walls thereof. The openings of each pair are opposite each other and between these opposite openings of each pair, the car is provided with a baggage receptive compartment. Each such compartment contains an electromagnet 105, as best shown in Figs. 12 and 14, whose core 106 projects from the magnet coil toward each side of the car and assists in determining the performance of the baggage piece 14 when it is being loaded into either side of the car as will later appear. Each of openings 104 is provided with a slidable door 108, making four doors all of which are so connected as to be opened and closed in unison by the action of a third electromagnet 109 located in the car between the compartments containing electromagnets 105. The core ends 110 of magnet 109 at a suitable time simultaneously attract the armatures 111 each of which is pivoted to the car frame at 112 but normally pulled away from its core 110 by a spring 113 which normally urges each armature to its full line position in Fig. 14 where it rests against an upright partition 115 fixed to the car frame. Each door 108 is guided to slide lengthwise of the car at both its bottom and top edges. The bottom edge slides in a guide trough 116 formed in the floor wall of the car. The top portions of opposite doors are connected by cross rods 117 which slide with the doors between full line and broken line positions in Figs. 13 and 14. These cross rods are acted upon simultaneously by a lazy tongs 18 whose free four ends respectively carry the four collars 119 which are slidably engaged with the cross rods 117 of the car doors in a manner clearly shown in Figs. 13, 14, and 15. In its contractile and expansive movements lengthwise of the car, the lazy tongs is maintained in straightway alignment by means of its central line of pivot pins 123 which slidingly engage with an elongated slot 124 formed in a roof bracket 125 rigid with the car frame. Each of armatures 111 carries a stiff angle arm 126 which projects upwardly through and rides lengthwise in the slot 124 and engages with one of two centrally located hollow pivotal joints or eyelets 127 of the lazy tongs thereby enabling the electromagnet 109 to extend the lazy tongs from its full line position to its broken line position in Fig. 13 for opening the car doors 108.

The floor of each car compartment occupied by electromagnet 105 comprises a swingable section 129 pivotally supported on the fulcrum pin 130 which is fixed to the car frame. Section 129 can swing upward from its full line position to its broken line position in Fig. 12. In its full line position the inner edge of section 129 rests on stationary frame pins 131. The upward swing of each section 129 is limited by a stop-pin 132 which also is fixed in the frame of the car. From each of the swingable or catapult sections there depends an armature 133 rigid therewith and positioned to be attracted by the core 134 of a catapult electromagnet 135. Thus there are four such catapult electromagnets as 135, 135', 137, and 137', arranged in two pairs, the magnets of each pair being rigidly supported beneath the car body in coaxial alignment crosswise of the car by means of an insulative bracket 136 fixed on the car frame. For purposes that will hereinafter appear, the roof portion of each baggage receptive compartment in the car is equipped with a baggage piece deflector shield 138 most clearly appearing in Figs. 12 and 16.

Means for electrically energizing simultaneously the windings of door-operating magnet 109 and baggage-piece attracting magnet 105, include the grounding of one end of each of said magnets to the car frame as at 145 (Fig. 17), wherefore current from said end of each winding passes to one or both of the traction rails 97, 98, and said electrical energizing means further include connection of the other end of each of said magnets to the terminal spring finger 139 which is carried below and insulated from the frame of the car by means of the terminal block 140 of non-conductive material and thus serves as a collector shoe wiping constantly against the central or "third" or power rail 141 of the train track, from which said rail the locomotive of the toy train (not shown) also derives its power throughout the length of the track in the toy railroad system. Thus it will be plain that whenever the train is running, car doors 108 are closed and magnet 105 is energized, whereas the instant current is cut off from the track for stopping, the train doors 108 open and magnet 105 becomes deenergized.

Means for conducting current at different selected times through the windings of each of catapult magnets 135', 137', 135, 137, which are carried by the car reside in the grounding of each such magnet to the car frame as at 146 (Fig. 17). Such current conducting means further reside in electrical connections between each of the said four magnets and four spring fingers 147, 148, 149 and 150, respectively, each of which is carried below and insulated from the frame of the car by one or the other portion of terminal block 140. Spring fingers 147, 148, 149, and 150 thus serve as collector shoes which, when the train draws up in front of the station, ride into contact with separate short sections of electrically conductive rails 154, 155, 156 and 157, respectively, located intermediate the traction rails 97 and 98 and insulated therefrom as well as from each other by bed plates 158 made of non-conductive material.

Means for conducting current at different selected times through the windings of each of the table tilting truck-carried magnets 43 and 44 includes the grounding of one end of the winding of each of said magnets to the truck body 19 as at 160 in Fig. 17, as well as the electrical connections hereinbefore referred to between the opposite separate ends of the windings of said two magnets and the truck-carried spring fingers or current collector shoes 40, 41.

Means for supplying the winding of magnet 61 at the repository 12 with current upon suitable occasions resides in the grounding of one end of said winding to the conductive material of the station platform as at 161 in Fig. 17, and also in the electrical connection of the other end of said winding to a remotely stationed selector control switch 162 shown in Fig. 17.

Means for supplying the field winding 163 and armature 164 of motor 71 with current in different directions of flow for reversing the direction of running of the motor upon suitable occasions is provided by grounding one side of said motor winding to the station platform as at 166 (Fig. 17) and also by electrical connections from other terminals of the motor to the before mentioned remote control switch 162 as shown in Fig. 17.

The stationary and individually insulated contacts of switch 162 are respectively denoted by letters from A to R, inclusive, and any one of such contacts may selectively be placed in circuit with the conductive distributor arm 165 which swings upon and in electrical contact with its pivot 169 which is electrically connected to one secondary terminal 170 of the toy power supply transformer so marked in Fig. 17, the other secondary terminal 171 of which connects with the ground as at 172 in said figure. All grounding points denoted in Fig. 17 as 145, 146, 160, 161, 166 and 172, are understood to be in constant electrical communication through various structural parts of the toy made of electrically conductive material. The tail portion of 173 of arm 165 is of nonconductive material and carries at its extremity, in Fig. 17, a contact-bridging conductive plate 174 capable at different times of bridging stationary contacts NM, OP, or QR.

The complete toy illustrated and described in the foregoing operates as follows. Assuming that the baggage piece 14 originally is resting on the repository 12 as shown in broken lines in Figs. 10 and 11 and that the station truck 17 is drawn up alongside repository 12 as indicated in broken lines in Fig. 10 at which time the distributor arm 165 of the remote control switch 162 is positioned as shown solid in Fig. 17, supply current is carried through the switch contact A only to the power rail 141 of the toy railway track system and thence through the electric motor of the locomotive of the train (not shown) to the traction rail 98 and thence back to the toy transformer terminal 171 or to "ground" 172 of the same polarity. Hence a train can be traveling along the track toward the station embodying these improvements. In Fig. 17 it will further be noted that the power rail 141 also supplies current through the car-carried collector "shoe" 139 to the car-door closing magnet 109 whose solenoid is further electrically connected with the ground 172 through the frame 102, wheels 99, and traction rail 98. Simultaneously the two drag-in magnets 105 in the baggage compartment of the car are energized through the power rail shoe 139, each of these magnets having its solenoid connected to ground 172 as is the solenoid of the car-door operating magnet 109.

As a first step in operating the toy by means of remote control switch 162, distributor arm 165 is shifted from contact A to contact B whereupon the power rail 141 of the track system is deprived of current and current is supplied instead to the magnet 61 beneath the baggage repository 12 whose solenoid is grounded to the station platform 10 at 161. The platform is, itself, connected to the ground 172 of the toy transformer it being understood that all grounds indicated in the wiring diagram of Figure 17 are electrically connected to be of common polarity. This smartly attracts the armature 64 and tilts the swingable repository top 13 upwardly to its broken line position in Figure 10 so that the baggage piece 14 slides onto, or is flung or catapulted onto track 17 thus transferring it from the repository to the truck. The train when deprived of power comes to rest with the baggage car positioned as in Figures 1 and 11. Also when the power rail 141 is deprived of current, the car-door operating magnet 109 is deenergized permitting springs 113 to pull the armatures 111 to their broken line positions in Figure 14 thus contacting the lazy tongs 118 to its broken line position in Figure 13 and to be simultaneously opening all four of the car doors. It may be assumed that the baggage accommodating compartment in the left end of the car in Figure 11, which is opposite the track side terminal 18, is empty, while the baggage compartment at the right end of the car contains, on the station side of the car-carried magnet 105, a second piece of baggage 14' at the time the train arrives at the station.

Figure 5:
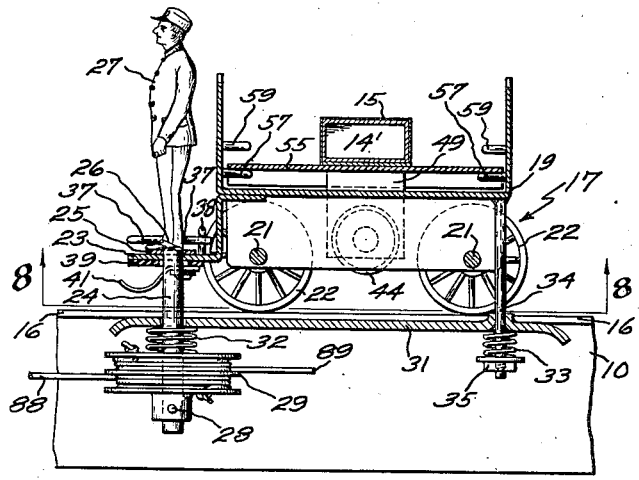
Fig. 5 is an enlarged view taken in central longitudinal section through the animated baggage truck on the plane 5—5 in Fig. 1.
Figure 8:
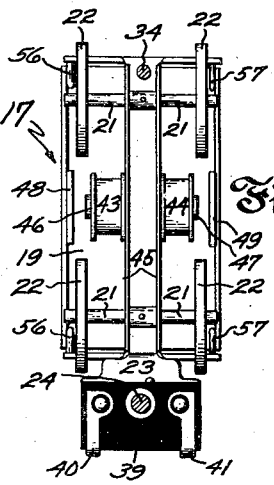
Fig. 8 is a correspondingly enlarged bottom plan view of the baggage truck taken in section on the plane 8—8 in Fig. 5.

The next step in the operation is effected by shifting distributor arm 165 from contact B to contact C. This deenergizes the solenoid of magnet 61 which permits the repository top 12 to drop to its full line normal position in Fig. 10 and furnishes current to the reversing motor 71 inside the station house so that this motor will run in a direction determined by the bridging of contacts M and N by the conductive plate 174 which swings with but is insulated from distributor arm 165. Motor 71 is grounded at 166 to the metallic structure of the station platform and thus is connected to the ground side 172 of the toy transformer. The said direction of motor running is such as to drive the pulley 70 clockwise in Fig. 1, or counterclockwise as in Fig. 3, so that the belts 88 and 89 travel in a corresponding direction at first winding and unwinding in equal amounts about pulleys 70 and 29 which are preferably of equal diameters. The initial turning of pulley 29 causes the figure of the baggage man 27 to turn a half circle from his position facing the truck as shown in Fig. 18 to his position facing away from the truck as shown in Fig. 5. At this point pulley 29 is prevented from rotating further because of the interception of stop-pin 37 by a stop-pin 38, whereupon the continued rotation of pulley 70 as driven by motor 71 pulls the truck 17 along the path of slot 16 from its position in front of repository 12 to the opposite extreme end of slot 16 which location is referred to at times herein as the track-side terminal 18. This movement of the truck is from right to left in Figs. 1, 3, and 11. In these figures the truck is shown about midway its limits of travel along the station platform.

When the truck has reached its track-side terminal 18, the operator will shift the distributor arm 165 from contact C to contact D. This deprives motor 71 of power and renders the platform-carried contact plate 91 alive, which contact plate has been temporarily established in circuit with the truck-carried contact shoe 40 as the truck arrives at the track-side terminal 18 so that the truck unloading magnet 43 becomes energized, its solenoid being grounded at 50 to the metallic body of truck 17 and hence connecting through the metallic structure of the station platform with the ground side 172 of the toy transformer. The armature 43 is thereupon drawn smartly toward the right in Fig. 6 resulting in abrupt tipping of the truck table 55 counterclockwise about its fulcrum pin 56 to its broken line position 55'. Its lifting movement is abruptly stopped by pin 59 resulting in the sliding off or the flinging or catapulting of the baggage piece 14 from the truck into the empty compartment of the car as best shown in Fig. 12. In this action of transferring the baggage piece from the truck onto the car, the deflector shield 138 has been found useful in preventing any misdirected overthrow of the baggage piece into some wrong portion of the car interior. If the baggage piece should chance to come to rest in a position wherein it fails to clear the doorway of the car, attracting magnet 105 acts at a proper time to pull the baggage piece inwardly of the car to such position as is shown in Fig. 12 for clearing the doorway of the car compartment as will later be described.

Having thus unloaded the baggage piece from the toy truck into the car compartment over or past the track-side edge of the depot platform 10, the operator proceeds to shift the distributor arm 165 of the remote control switch from contact D to contact E. In this new position of the distributor arm the conductive plate 174 carried thereby in insulated relation thereto bridges contacts O and P (instead of M and N). This starts the running of motor 71 in a direction reverse to that which pulled the truck to the track-side terminal 18 and the truck magnet 43 becomes deenergized permitting the truck table 55 to drop to its normal full line position in Fig. 6. This reverse running of motor 71 rotates pulley 70 counterclockwise in Fig. 1, or clockwise in Fig. 3, so that corresponding reverse travel of belts 88 and 89 first turns pulley 29 in a direction to rotate the figure of the baggage man to his position facing the truck, as in Fig. 18, at which time the stop-pin 37 engages with stop-pin 38 to prevent further rotation of the figure. Thereupon the action of the belt proceeds to pull the truck toward the right in Figs. 1 and 11. When the truck has arrived opposite the doorway of the car compartment which contains baggage piece 14', the operator may shift distributor arm 165 from contact E to contact H, thus stopping the running of motor 71 and leaving the truck at rest in its position described.

Through contact H the short rail section 156 is provided with current so that through the collector shoe 149 the car unloading magnet 135 beneath the compartment which contains baggage piece 14' in Fig. 12 is energized, its solenoid being grounded at 146 to the frame of the car and thereby electrically connected through the wheels 99 of the car and track rail 98 to the ground side 172 of the toy transformer. This draws the armature 133 smartly toward the left in Fig. 12 and tilts the car floor section 129 upwardly about its fulcrum pin 130 until its movement is abruptly checked by stop-pin 132 in the broken line position shown in Fig. 12. This causes the baggage piece 14' to slide off from the car floor section onto truck 17 or to be flung or catapulted from the car floor section to the truck. If baggage piece 14' differs in appearance from baggage piece 14 as to color, shape, or size, it will be apparent to the observer that a different article of baggage has been unloaded from the car than that which was formerly loaded into the car. The construction of each baggage piece wherein its inner body of magnetically attractable material is covered by a thin shell 15 of non-magnetic material, such as brass, prevents any residual magnetism in the core 106 of electromagnet 105 from causing the baggage piece to adhere to said core after its solenoid has been deenergized. It will be understood that through additional short sections of the electrically conductive rails such as 154, 155, and 157, any one of the magnets 137', 135', and 137 may selectively be caused to eject from their respective car compartments any baggage piece occupying such compartment whenever the solenoids of these three electromagnets are energized through collector shoes 147, 148, or 150 respectively. This may be accomplished merely by placing the distributor arm 165 against contacts F, G, or I, respectively, of the remote control switch. It will also be understood that the construction of switch 162 is such that the distributor arm 165 need not sweep the various lettered contacts of this switch sequentially but may be lifted clear of certain contacts and pass them, without supplying current thereto, for reaching other selected contacts. An optional sequence of performance of the loading and unloading apparatus is thus available but a designed cycle of performance results from moving the distributor step-by-step clockwise in Fig. 17. The four compartments in the baggage car, each having the ability to receive and eject the same or a different piece of baggage, make the car universally usable for loading and unloading purposes by means of the remote control switch and regardless of which side of the car may be adjacent to the platform of the station on which the baggage truck operates.

Having thus transferred the baggage piece 14' from the truck to the car, the operator may shift the distributor arm 165 from contact H to contact J, in which latter position of the distributor arm the insulated plate 174 will bridge contacts Q and R causing motor 71 to run in the same direction as when the distributor arm fed current to contact E. In other words, this position of the remote control switch causes truck 17 to resume its travel from left to right in Figs. 1 and 11 until it reaches its original location in front of baggage repository 12. At this time the electrical contact finger 41 carried by the truck conductively engages the circuit terminal plate 93 which is supported on and insulated from the station platform, while the other contact finger 40 carried by the truck has now been removed from engagement with the other circuit terminal plate 91 by the travel of the truck. The circuit connections between the motor field winding 163 which is grounded to the station platform at 166, and the brushes of armature 164 of the electric motor and the contacts C, E, J, M, N, O, P, Q, and R, of the remote control switch will be clear from the wiring diagram and need no detailed description.

The operator will next shift distributor arm 165 from contact J to contact K, whereby current is delivered to the truck carried magnet 44 through terminal plate 93 and truck carried contact finger 41, the solenoid of this magnet being grounded at 50 in common with the solenoid of truck carried magnet 43. Thereupon the truck table 55 will be tilted smartly upon its fulcrum pin 57 from its full line position in Fig. 6 clockwise to its broken line position 55" where the lift of the table is abruptly checked by stop-pin 58. This causes baggage piece 14' to slide off from the truck onto the swingable floor section 13 of the raised landing or baggage repository 12, or to be flung or catapulted from the former to the latter.

After the above described series of operations or some desired part thereof has been carried out in a sequence which is optional with the desire of the operator through the ability of distributor arm 165 to be placed selectively at any time on any one of the lettered contacts of the remote control switch, this distributor arm may finally be shifted to contact L, whereupon the truck magnet 44 will be deenergized and current supply will be restored to the power rail 141 of the track system, just as when the distributor arm was originally located at contact A, so that the train will start running under its own power and pull out from in front of the station. At the same time and through current collector shoe 139, the magnets 105 in the baggage compartments of the car become reenergized and attract to themselves any baggage piece which may have been loaded incompletely into the car and therefore be standing in the way of the closing of the door. At the same time the door closing magnet 109 becomes energized also through the same collector shoe 139, and overcomes the armature biasing springs 113 causing the armatures 111 to assume their full line position in Fig. 14 and thus elongate the lazy tongs 118, thereby closing all four of the car doors simultaneously. It will be understood that current collecting shoe 139 rides constantly in contact with the power rail 141 throughout the length of the track system of the toy railway, but if desired, the current collecting shoes 147, 148, 149, and 150 need have no rails to engage except when the car is standing at the station or in some other particular location along the track where its various door and baggage actuating magnets need to be energized for assisting in loading or unloading operations or the like.

The invention may be embodied in forms of toy apparatus differing from the exact parts herein disclosed and many modifications of the latter may be resorted to within the intended scope of the appended claims. For example, the raised landing 12, or some equivalent therefor, may be located as close to the railroad track as is the truck 17 when at track location 18 so that an article of luggage can appear to be loaded directly from the raised landing into the railway car or vice versa without resorting to the intermediary performance of the baggage truck 17. The remote control switch 162 may take the form of a drum type of step-by-step circuit controller operated by repeatedly depressing a single push-button or control handle operating a ratchet pawl drive in well understood manner. The circuits may be varied in many ways from those shown in Fig. 17 and the railroad track may consist of only two traction rails or may comprise a three-rail system involving the "third" or power rail as herein employed.

The completeness of the toy as hereinbefore described is illustrative of a full and logical series of electrically controlled loading and unloading performance characteristic of the actual activities at a real railway station. A simplified modification of the toy which eliminates complications of baggage simulating performance and electrical control, but which preserves the realistic performance of the animated truck and baggage man figure, is illustrated in Figs. 18 to 24, inclusive.

Here merely to simplify disclosure there is omitted from the illustration of truck 17', the baggage catapulting table 55 with its associated devices and there is also omitted the stops 37 and 38 for the figure man 27' although these omitted parts may as well be employed in practice and in the forms hereinbefore described.

Beneath the station platform 10' the presser strip 31 is replaced by a rigid plate 180 having an elongated aperture 181 stamped out of the plate in a manner to leave a long narrow central tongue 182 which is bent at right angles as shown in Fig. 18 so as to upstand stiffly from plate 180. The top end 183 of tongue 182 is bent over and projects through an aperture in the upright portion of the support shelf 23' which like shelf 23 is carried fixedly at one end of the truck. In this way the upstanding tongue 182 serves to help guide and steady the truck.

Tongue 182, together with shaft 184 which replaces shaft 24, and post 185 which replaces post 34, project vertically through an elongated slot 16' in the floor wall of platform 10' corresponding to slot 16. Top and bottom shoulders on shaft 184 space apart the truck shelf 23' and the plate 180 a proper distance to permit the truck wheels 22 to roll freely upon platform 10' as they rotate on their axles 21 and without needless looseness. The bottom shoulder on post 185 cooperates to this same purpose, the upper portion of post 185 being fast to the body of this simplified form of truck 17'. The bottom end of post 185 is of reduced diameter and is threaded to take nut 186, between which nut and the plate 180 there is fixedly clamped one end of a leaf spring 187 whose free end occupies and is free to flex upward and downward within aperture 181 and constantly presses upwardly against the bottom surface of the floor wall of platform 10' at both sides of slot 16'. This lightly draws the truck wheels 22 downward and maintains them in rolling contact with platform 10'. As will hereinafter become clear, spring 187 thus provides sufficient frictional resistance to the travel of truck 17' along slot 16' to hold the truck stationary while the baggage man figure 27' performs turning movement. The lower end of shaft 184 is of reduced size and has pinned thereto a pinion 188 which turns in unison with the man figure 27', the latter being fixed to the top end of the shaft. The reduced ends of shaft 184 rotate freely in the truck shelf 23' and plate 180 respectively.

In Fig. 19 a pinion 189 replaces the belt pulley 70 and is fast to the motor driven shaft 67. In mesh with this motor driven pinion 189 there is a large gear 190 flanking the bottom of the floor wall of the platform and retained rotatably on the shouldered pivot stud 191 fixed in platform 10'. Pivotally connected to the bottom face of gear 190 by means of shoulder stud 193 there is a pitman link 192 spaced downward from the gear sufficiently to clear all of the before described parts as the pitman link end is carried around and around by rotation of the gear.

Link 192 serves to cause back and forth swinging movement of an extensible actuating arm 196 composed of a shallow channel strip 197 and a bar 198 slidable longitudinally thereof. Bar 198 is partially embraced by bent over ears 199 projecting inward from the side walls of channel strip 197 at one end of the strip and bar 198 has a T-shaped tongue 200 slidably engaged with an elongated slot 201 in the channel strip. Near one end of this slot, the pitman link 192 is pivotally connected to channel strip 197 by a shouldered rivet 202 or other suitable means.

A bracket 206 is fixed to the bottom surface of 10' by screws 205 and a long pivot screw 207 spans the space between bracket 206 and the wall of platform 10' to afford a stationary pivot for one end of channel strip 197, the latter being maintained at a proper distance below the platform by a spacer collar 208. At the opposite extreme end of the compound actuating arm 196, the bar 198 is pivotally connected to a sliding rack 209 by means of the shouldered stud 210. Rack 209 comprises a flat strip of stiff material having a series of gear teeth 211 cut in one edge thereof which ride in mesh with the pinion 188. Rack 209 is slidably retained in face to face relation to plate 180 by two shouldered guide studs 212 fixed in plate 180 and which project respectively through elongated slots 213 cut in the rack.

The operation of the simplified form of toy illustrated in Figs. 18 to 24 consists in the imparting of continuous uni-directional rotation to gear 190 by pinion 189 so long as current is continually supplied to the station contained electric motor 71. This swings the actuating arm 196 first in one and then in the other direction about its stationary pivot 207 between full line and broken line positions in Figs. 19 through the action of the connecting or pitman link 192. As the free end of actuating arm 196 in the particular form of construction illustrated must travel in a straight line, as determined by the straight guide slot 16' in the station platform, telescopic lengthwise sliding of the bar 198 relative to the channel strip 197 will take place to accommodate the length of the actuating arm to different positions through which it swings.

Starting from its full line position in Fig. 19, the initial portion of the swing of the actuating arm will result in no travel of the plate 180 and truck 17' along slot 16' because the friction caused by the pressure of leaf spring 187 against platform floor wall 10' is sufficient to hold the truck stationary while the rack 209 is moved toward the right in Fig. 19 by actuating arm 196 through a distance equal to the clearance in the rack slots 213. But this movement of the rack relative to plate 180 rotates pinion 188, and hence the toy baggage man figure 27', a half turn so that he faces toward the truck instead of away from the truck. Guide studs 212 prevent further relative movement between rack 209 and plate 180 so that continued swinging of the actuating arm 196 toward the right in Fig. 19 overcomes the frictional resistance of leaf spring 187 and carries with it plate 180 and thereby truck 17' the entire length of slot 16' from a position near the train track to a position near the baggage room of the station house 11'. If the electric motor is not stopped at this time gear 190 will continue to rotate and cause automatically reversed movement of the rack 209.

The first portion of this reverse rack movement will result only in turning the baggage man figure so that he faces away from the truck instead of toward the truck, the latter itself, remaining stationary because of the friction caused by leaf spring 187. However when all of the play in slots 213 has been taken up, continued reverse swinging of actuating arm 196 carries truck 17' with it toward the left in Fig. 19 until the parts are restored to their starting position shown in full lines.

It will be appreciated that the truck can be stopped and started in its travel, and also the independent turning movement of the baggage man figure can be stopped and started, at will, through electric control of the motor. Different from the form of the invention disclosed in Figs. 1 to 17, inclusive, there exists in this modified form of the invention shown in Figs. 18 to 24, a mechanical means for reversing the direction of travel of the station truck without of necessity requiring the direction of running of the electric motor to be reversed. It will be apparent that there are many simple mechanical substitutes which can be made for the elements chosen herein to illustrate the underlying principles of the invention.

The following claims will be understood to include in their intended scope all equivalents and substitutes for the particular parts of the apparatus herein illustrated which might be suggested to workers in this art by the disclosure hereof.

I claim:

1. Animated toy depot apparatus for automatically conveying a simulated baggage piece or the like, including in combination, a toy structure simulating a depot building and its platform the latter having an edge adapted to flank a toy railway track, a toy truck adapted at times to hold and convey a simulated baggage piece and supported to travel on said platform, means to guide said truck along said platform in a path of back and forth travel between a starting position relatively close to said depot building and a track-side position relatively close to said platform edge, and power means operatively associated with said truck in a manner to cause the latter automatically to perform excursions along said path to and from its said track-side position.

2. Animated toy depot apparatus for automatically handling simulated baggage or the like, including in combination with a simulated baggage piece, a structure simulating a depot building and its platform the latter having an edge adapted to flank a toy railway track, a toy truck adapted at times to hold and convey said baggage piece and supported to travel on said platform, means to guide said truck in an excursion toward and away from a track-side position relatively close to said platform edge, power means operative to cause said truck to perform said excursion, and means carried by said truck constructed and arranged to discharge said baggage piece therefrom and past said edge of the platform when said truck occupies its said track-side position.

3. Animated toy depot apparatus for automatically handling simulated baggage or the like, including in combination with a simulated baggage piece, a toy structure simulating a depot building and its platform the latter having an edge adapted to flank a toy railway track, a toy truck adapted at times to hold and convey said baggage piece and supported to travel on said platform, means to guide said truck along said platform in a path of back and forth travel between a starting position relatively close to said depot building and a track-side position relatively close to said platform edge, power means operative to cause said truck to move in both directions along said path, a raised landing adapted at times to support said baggage piece and stationed on said platform proximate said starting position of the truck, and means stationed at and in operative association with said raised landing operative to discharge said baggage piece therefrom onto said truck when the latter occupies its said starting position.

4. Animated toy depot apparatus for automatically handling simulated baggage or the like, including in combination with a simulated baggage piece, a toy structure simulating a depot building and its platform the latter having an edge adapted to flank a toy railway track, a toy truck adapted at times to hold and convey said baggage piece and supported to travel on said platform, means to guide said truck along said platform in a path of back and forth travel between a starting position relatively close to said depot building and a track-side position relatively close to said platform edge, power means operative to cause said truck to move in both directions along said path, a raised landing adapted at times to support said baggage piece and stationed on said platform proximate said starting position of the truck, means stationed at and in operative association with said raised landing operative to discharge said baggage piece therefrom onto said truck when the latter occupies its said starting position, and means carried by said truck operative to discharge said baggage piece therefrom and past said edge of the platform when said truck occupies its said track-side position.

5. Animated toy depot apparatus as defined in claim 1, in which the said platform of the said toy structure is hollow and in which the said power means includes a reversible electric motor, a winding and unwinding capstan pulley within the interior of said platform driven by said motors and flexible draft connections within the interior of said platform extending in different directions from said capstan pulley to the said toy truck in a manner to enable said motor to impel said truck either backward or forward in its said path of travel.

6. In an animated toy for imitating the transfer of baggage at a railroad station, the combination of, a toy station platform having a raised floor containing an elongated slot, a toy baggage carrying truck adapted to perform back and forth travel on the top of said floor along said slot, plural spaced guide members attached to said truck extending through said slot to beneath said floor for maintaining said truck in predetermined alignment with said slot as it travels therealong, a winding drum supported beneath said floor with the assistance of at least one of said guide members in a manner to move bodily with and to rotate relative to said truck, an animatable toy element operably connected to said drum to derive motion therefrom, flexible draft means in part extending around said drum, and pulley wheels located beneath said floor near the opposite ends of said slot and engaged by said draft means.

7. In an animated toy as defined in claim 6, the combination defined in said claim, together with a prime mover mounted on the top of the said raised floor of the toy station platform, and means extending through said floor for transmitting motion from said prime mover to the said flexible draft means.

8. In an animated toy as defined in claim 6, the combination defined in said claim together with a hollow toy house structure upstanding from the said toy station platform adjacent the said elongated slot in the said floor of the latter, a prime mover above said floor housed and concealed by said structure, and means extending through said floor arranged therebeneath to transmit motion from said prime mover to the said flexible draft means.

9. In an animated toy for imitating the performance of a baggage truck and its attendant, the combination of a toy station truck including a simulated baggage carrying body, an operator's platform carried by said truck in offset relation to said body, a toy figure representing a man mounted in standing position on and in rotatable relation to said platform, means to prevent sidewise travel of said truck, and common actuating means constructed and arranged to impel said truck lengthwise and to turn said toy figure relative thereto.

10. In an animated toy as defined in claim 9, the combination defined in said claim together with means constructed and arranged to limit the extent of turning of the said toy figure relative to the said vehicle in a manner to cause said turning of the figure and the travel of said vehicle to take place successively.

11. Mechanism for discharging an article of toy baggage or the like from the table-like surface of a support therefor, including in combination, a fulcrum, a tiltable section of said support carrying said surface and resting pivotally on said fulcrum including a magnetically attractable armature swingable in unison with said section in an arc about said fulcrum, an electro-magnet stationed to attract said armature in a direction to tilt said section about said fulcrum to an inclined position, and a stop arranged in the path of tilting movement of said section thereby suddenly to check the swing of said section while the latter is being tilted by said electromagnet whereby a catapulting impetus is imparted to said article of toy baggage.

12. Apparatus for loading and unloading baggage into and from a toy railroad car including in combination with a magnetically attractable toy article of baggage, a car compartment, one or more movable doors controlling access to said compartment, at least one baggage attracting electromagnet in said compartment each presenting a magnetic attracting core in the neighborhood of one door, mechanism constructed and arranged to impart opening and closing movement to each of said doors, and an electrical motivator carried by said car and operatively related to said mechanism for operating each door, together with circuit connections causing said baggage attracting electromagnet to be energized when said motivator acts to close a door, thereby to remove an improperly loaded baggage article from the path of closing movement of the door.

13. An animated toy for imitating baggage handling at a railway station comprising in combination, a toy station including a house structure and a platform exterior thereto, a toy baggage piece, a repository for said baggage piece associated with said house structure, a toy track beside said platform, a toy railway car upon said track, a toy baggage truck constructed and arranged to perform excursions between said repository and railway car, electrically energizable means to impel said truck to perform said excursions, electrically energizable means incorporated in said repository for transferring a baggage piece therefrom to said truck, electrically energizable means incorporated in said truck for transferring a baggage piece therefrom selectively to said repository or to said car, electrically energizable means incorporated in said car for transferring a baggage piece therefrom to said truck, and electrical control circuits containing said several means selectively energizable at a point remote from said toy thereby to cause operation of its said parts in desired sequence.

14. A coordinately animated figure and vehicle toy including the combination with an operatively connected figure and vehicle, of a floor wall therebeneath containing an elongated slot, a shaft operatively connected to said figure and extending through said slot, and actuating means beneath said floor wall constructed and arranged both to rotate said shaft and to cause said shaft to move bodily along said slot.

15. A coordinately animated figure and vehicle toy including the combination with an operatively related figure and vehicle, of a floor wall therebeneath containing an elongated slot, structure beneath said floor wall adapted to move in unison with said vehicle lengthwise of the slot, connections between said structure and vehicle extending through said slot, a shaft extending through said slot operatively connected to said figure and turnable in relation to said vehicle and structure, and actuating means beneath said floor wall constructed and arranged to cause rotative movement of said shaft and to cause said structure and vehicle to move bodily along said slot.

16. A coordinately animated figure and vehicle toy as defined in claim 14 together with means to resist bodily movement of the said shaft along the said slot while said shaft is being rotated.

17. A coordinately animated figure and vehicle toy as defined in claim 15 together with means to resist bodily movement of the said structure and vehicle bodily along the said slot while the said shaft is being rotated.

18. Mechanism for imparting both rotary and translatory movement to parts of an animated toy including in combination, a guideway, a toy device movable along and above said guideway, a toy member constructed and arranged to travel along and above said guideway with said device and to be rotatable relative to the latter, and impelling instrumentalities below said guideway having both lost motion driving connection to said device and rotation causing driving connection to said member, whereby said member may accompany movement of said device and also be rotated relative to said device.

19. Mechanism as defined in claim 18 in which the said impelling instrumentalities include a pinion connected to rotate in unison with the said toy member and a reciprocator carrying gear teeth movable in mesh with said pinion and relatively to the said toy device thereby to rotate the said toy member, together with means to limit the range of movement of said reciprocator relative to said device, whereby travel of said reciprocator in excess of said range of movement ceases to rotate said toy member but impels said toy device along said guideway.

20. In an animated toy, the combination of a toy depot platform having a raised floor containing an elongated dead ended slot, a toy truck adapted to perform back and forth travel on the top of said floor along said slot, guide means attached to said truck extending through said slot to beneath said floor constructed and arranged to keep said truck in lengthwise parallel relation to said slot, and power transmitting mechanism supported by said platform beneath said floor constructed and arranged to convert unidirectional drive motion into reciprocative drive motion and operatively connected to said guide member for impelling said truck alternately back and forth in the same reach of said slot.

21. In an animated toy railway depot, the combination defined in claim 20, together with a hollow toy house structure upstanding from the said toy station platform adjacent the said elongated slot in the said floor of the latter, and a prime mover above said floor housed and concealed by said structure, and means in part extending through said floor constructed and arranged therebeneath to transmit motion from said prime mover to the said power transmitting mechanism.

22. In an animated toy, the combination of a toy station platform having a raised floor containing an elongated slot, a toy truck adapted to perform back and forth travel on the top of said floor along said slot, a guide member attached to said truck extending through said slot to beneath said floor, and reciprocative mechanism beneath said floor operatively connected to said guide member for impelling said truck in alternately opposite directions, said reciprocating mechanism including a compound arm swingably mounted beneath the said platform floor and composed of longitudinally overlapped members relatively movable in a telescopic manner to permit variation in the effective length of said arm as the latter swings for motivating the said guide member and truck.

23. In an animated toy, the combination defined in claim 22, together with a unidirectional prime mover, and mechanism constructed and connecting the said prime mover and the said arm in such manner that undirectional operation of said prime mover causes swinging movements of the said arm in alternately reverse directions.

24. Mechanism for discharging an article of toy baggage or the like as defined in claim 11, in which the said tiltable section forms a structure of bell crank shape having a sometimes nearly horizontal portion carrying the said tablelike surface and having a sometimes nearly vertical portion carrying the said armature, the said electromagnet occupying a corner-like space flanked by both said portions of said bell crank structure.

25. In an animated toy, the combination defined in claim 20 in which the said reciprocative mechanism includes an arm mounted to sweep through an arcuate path of travel, together with connections constructed and arranged to transmit movement from said arm to said toy truck.

WILLIAM R. SMITH.